(12) United States Patent
Cawse et al.

(10) Patent No.: US 6,826,487 B1
(45) Date of Patent: Nov. 30, 2004

(54) METHOD FOR DEFINING AN EXPERIMENTAL SPACE AND METHOD AND SYSTEM FOR CONDUCTING COMBINATORIAL HIGH THROUGHPUT SCREENING OF MIXTURES

(75) Inventors: James Norman Cawse, Pittsfield, MA (US); Ronald James Wroczynski, Schenectady, NY (US); Darchun Billy Yang, San Dimas, CA (US)

(73) Assignee: General Electric Company, Schnectady, NY (US)

(*) Notice: Subject to any disclaimer, the term of this patent is extended or adjusted under 35 U.S.C. 154(b) by 278 days.

(21) Appl. No.: 09/696,071

(22) Filed: Oct. 25, 2000

(51) Int. Cl.[7] .............................................. G01N 33/48

(52) U.S. Cl. ................................ 702/19; 702/20; 435/4

(58) Field of Search .......................... 702/19, 20; 435/4

(56) References Cited

U.S. PATENT DOCUMENTS

| | | | | |
|---|---|---|---|---|
| 5,621,665 | A | 4/1997 | Ghosh et al. ................ | 364/552 |
| 5,901,069 | A | 5/1999 | Agrafiotis et al. ..... | 364/528.03 |
| 5,917,077 | A | * 6/1999 | Chaudhari et al. .......... | 558/274 |
| 5,961,923 | A | * 10/1999 | Nova et al. ................ | 422/68.1 |
| 6,044,212 | A | 3/2000 | Flavin et al. .......... | 395/506.27 |

FOREIGN PATENT DOCUMENTS

| | | | | |
|---|---|---|---|---|
| WO | 0023921 | 4/2000 | ................... | 102/19 |

OTHER PUBLICATIONS

U. Rodenerck et al., "Parallelisierte Syntheses Und Schnelle Katalytische Testing von Katalysator Bibliotheken Fuer Oxidationsreaktionen," Chemie, Ingenieur. Technik, vol. 71, No. 8, 8/99, pp. 873–877, XP0053115, Weinheim, DE.

Reddington, E., Sapienza, A. Guru, B. Viswanathan, R., Sarangapani, S., Smotkin, ES, Mallouk, TE, Combinatorial Electrochemistry: A Highly Parallel, optical Screening Method for Discovery of Better Electrocatalysts, vol. 280, pp. 1735–1737, Science 1998.

Senkan, S., Krantz, K., Oztrurk, S., Zengin, V., Onal. I., High–Throughput Testing of Heterogeneous Catalyst Libraries Using Array Microreactors and Mass Spectrometry, Angew. Chem. Int. Ed., vol. 38, pp. 2794–2803 (1999).

Cong, P., Doolen, RD, Fan, Q. Giaquinta, DM, Guan, S, McFarland, EW, Poojary, DM, Self, K., Turner, HW. Weinberg, H., High–throughput Synthesis and Screening of Combinatorial Heterogeneous Catalyst Libraries, Angew. Chem. Int. Ed., vol. 38, pp. 484–488 (1999).

Jandeleit, B., Schaefer, DJ, Powsers, TS, Turner, HW, Weinbert, WH, Combinatorial Materials Science and Catalysis, Angew. Chem. Int. Ed. vol. 38, pp. 2495–2532 (1999).

(List continued on next page.)

*Primary Examiner*—Ardin H. Marschel
*Assistant Examiner*—Carolyn L. Smith
(74) *Attorney, Agent, or Firm*—Andrew J. Caruso; Philip D. Freedman

(57) ABSTRACT

A method comprises (A) defining a first experimental space comprising factors of at least two mixtures with at least one common factor, (B) defining a second experimental space by deleting duplicate factor combinations from the first experimental space and (C) conducting an experiment on the second experimental space. A system comprises a processor that (A) defines a first experimental space comprising factors of at least two mixtures with at least one common factor and (B) defines a second experimental space by deleting duplicate factor combinations from the first experimental space. The system also comprises a reactor and evaluator to select a best case set of factors from the second experimental space by a combinatorial high throughput screening (CHTS) method to select a best case set of factors from the second experimental space.

16 Claims, 6 Drawing Sheets

OTHER PUBLICATIONS

J.M. Newsam: "Design of Catalysts and Catalyst Libraries Computational Techniques in High Throughput Experimentatin for Catalysis", NATO ASI Series. Series C: Mathematical and Physical Sciences, 1999, pp. 301–335, XP000987013, Dordrecht, NL.

D. Wolf et al.: "An Evolutionary Aproach in the Combnatorial Selection and Optimization of Catalytic Materials", Applied Catalysis A: General, vol. 200, No. 1–2, Aug. 28, 2000, pp. 63–77, XP004272448, Amsterdam, NL.

H. Okamoto et al: "Design of a Robotic Workstatin for Automated Organic Synthesis", Laboratory Robotics and Automation, vol. 12, 2000, pp. 2–11, XP000921009, New York, USA.

Hau Du et al.: "An Automated Microscale Chemistry Workstation Capable of Parallel, Adaptive Experimentation", Chemometrics and Intelligent Laboratory Systems, Vo.. 48, No. 2, Aug. 2, 1999, pp. 181–203, XP004171920, Amsterdam, NL.

H. Van de Waterbeemd et al.: "Glossary of Terms used in Computational Drug Design", Compendium of Chemical Terminology, International Union of Pure & Applied Chemistry (IUPAC) Recommendations, Oxford, Blackwell Scientific, 1987, pp. 1137–1152, XP000770841.

P.Y. Kuo et al.: "A planning module for performing grid search, factorial design, and related combinatorial studies on an automated chemistry workstation", Chemometrics and Intelligent Laboratory Systems, vol. 48, No. 2, Aug. 2, 1999, pp. 219–234, XP004171922, Absterdam, NL.

Wolf et al., "An Evolutionary Approach in the Combinatorial Selection and Optimization of Catalytic Materials", Applied Catalysis A: General 200, 63–77 (2000).

* cited by examiner

METHOD FOR DEFINING AN EXPERIMENTAL SPACE AND METHOD AND SYSTEM FOR CONDUCTING COMBINATORIAL HIGH THROUGHPUT SCREENING OF MIXTURES This invention was made with government support under Contract No. 70NANB9H3038 awarded by NIST. The government may have certain rights in the invention.

BACKGROUND OF THE INVENTION

The present invention relates to a method for defining an experimental space and a method and system for conducting combinatorial high throughput screening of mixtures.

A gradient combinatorial study is a thorough method for studying an experimental space of a mixture. However, a thorough gradient study requires a relatively large number of experimental points. For example, even a simple commercial process may have three to five or more critical components, each of which can be chosen from a list of possibilities. These components can include reactants, solvents, additives and catalysts. As shown in FIG. 1, the number of possible experimental points can become very large, depending on the number of intervals in the gradient. Accordingly, it may be necessary to search hundreds or thousands of combinations to find a handful of "leads," i.e., combinations that may lead to commercially valuable applications.

It is extremely difficult to examine all possibilities of such a complex space even with a very productive high throughput screening (HTS) system. The space can be decreased by decreasing the number of factors or by enlarging increments between test parameters. However both these approaches decrease accuracy and certainty of results. There is a need for an improved method to rapidly, yet effectively investigate a complex experimental space without diminishing accuracy or certainty of results.

BRIEF SUMMARY OF THE INVENTION

The present invention provides a method and system to investigate an experimental space without diminishing accuracy or certainty of results. The method comprises (A) defining at first experimental space comprising factors of at least two mixtures with at least one common factor, (B) defining a second experimental space by deleting duplicate factor combinations from the first experimental space and (C) conducting an experiment on the second experimental space.

The system comprises a processor that (A) defines a first experimental space comprising factors of at least two mixtures with at least one common factor and (B) defines a second experimental space by deleting duplicate factor combinations from the first experimental space. The system also comprises a reactor and evaluator to select a best case set of factors from the second experimental space by a combinatorial high throughput screening (CHTS) method to select a best case set of factors from the second experimental space.

According to another embodiment of the invention, an experimental space that comprises a number of mixture combinations is defined by an algorithm, which expresses sum of terms:

$$V + \prod_{i=1}^{T} n_i \times I_1 + \left(\sum_{i=1}^{T} \frac{1}{n_i}\right) \cdot \left(\prod_{i=1}^{T} n_i\right) \times [I_{(T-1)}]$$

for a ternary system (T=3) or an algorithm for a succeeding T-nary system, determined from a previous term by:(a) adding an additional term which contains an additional summation, incremented over a next index from a starting point one unit higher than the first summation:(b) decrementing the subscript on I; and (c) adding a value of n, indexed by the next index, to the inverse term.

DETAILED DESCRIPTION OF THE INVENTION

According to the invention, a method and system are provided to efficiently conduct mixture experiments. A mixture experiment is an experiment in which response is assumed to depend only on the relative proportions of the ingredients or factors present in the mixture and not on the amount of the mixture. In a mixture experiment, if the total amount is held constant and the value of the response changes when changes are made in the relative proportions of the ingredients or factors making up the mixture, then the behavior of the response is said to be a measure of the joint blending property of the ingredients or factors in the mixture.

An experimental space is a preselected number of experimental runs to he performed at various predetermined combinations of proportions of factors. The space is the set of preselected combinations of proportions or blends of factors.

According to the invention, multiple factors in multiple systems are studied simultaneously. Duplicate experiments are omitted from the study. Hence the number of experiments required to separately study the systems is reduced. For example, several ternaries (three factor systems) or quaternaries (four factor systems) can be studied simultaneously and factors common to the multiple gradients can be eliminated. Single ternary and quaternary systems can be represented by two-dimensional triangular or three-dimensional tetrahedral graphs, respectively, where each vertex represents one of the factors, each edge represents mixtures of two factors and each face represents mixtures of three factors. Four factor combinations in quaternaries are considered interior (4-D) points. In effect, the use of multiple overlapping ternaries or quaternaries is obtained by overlapping common sides for the individual triangles in the ternary systems and common faces of the tetrahedra in the quaternary systems. Duplicate spaces for a given number of mixtures are determined and discarded and the resulting space simultaneously representing both or all the systems can be studied.

Figure 1:
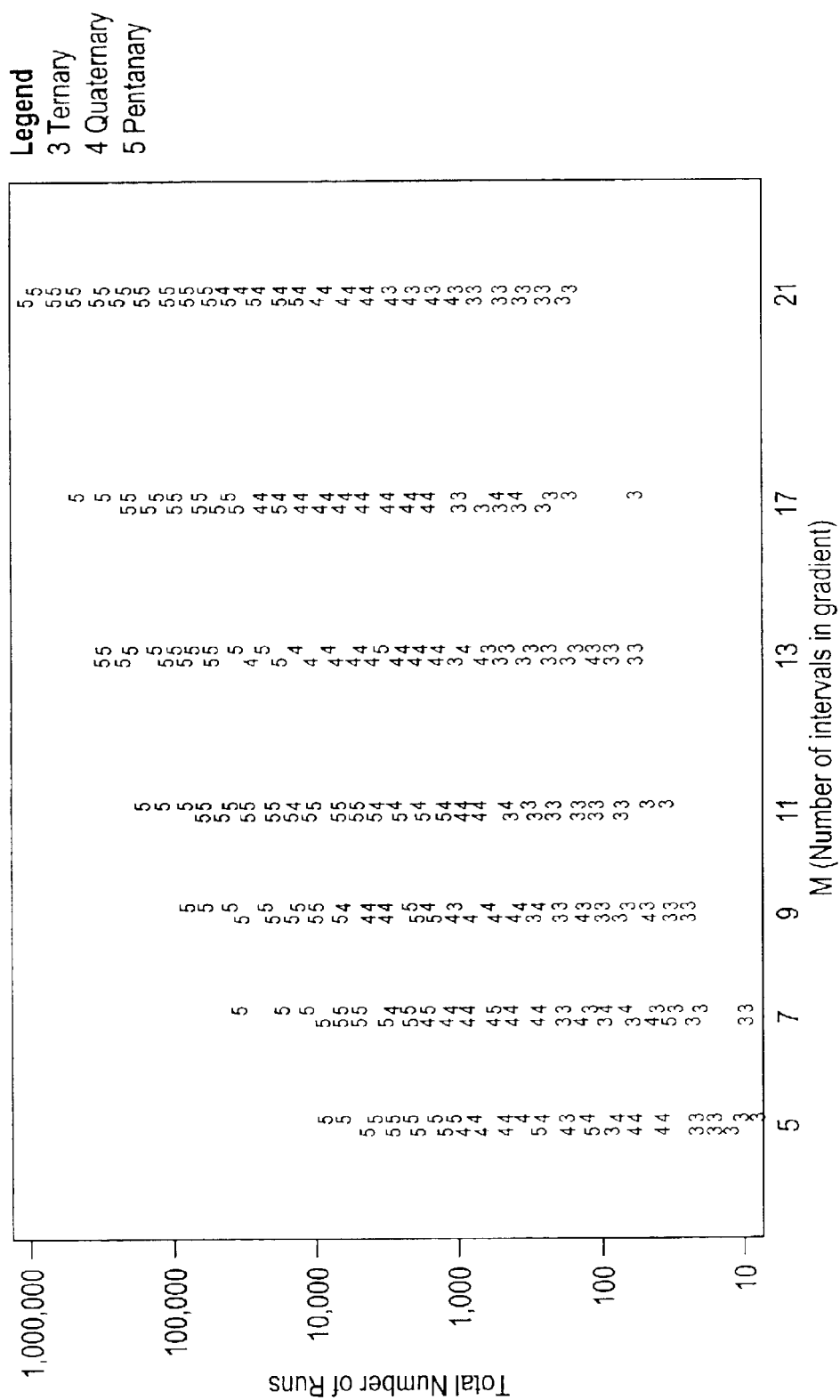
FIG. 1 is a graph of the number of experiments needed for mixtures in ternary, quaternary and pentanary systems with various numbers of alternative components.
Figure 2:
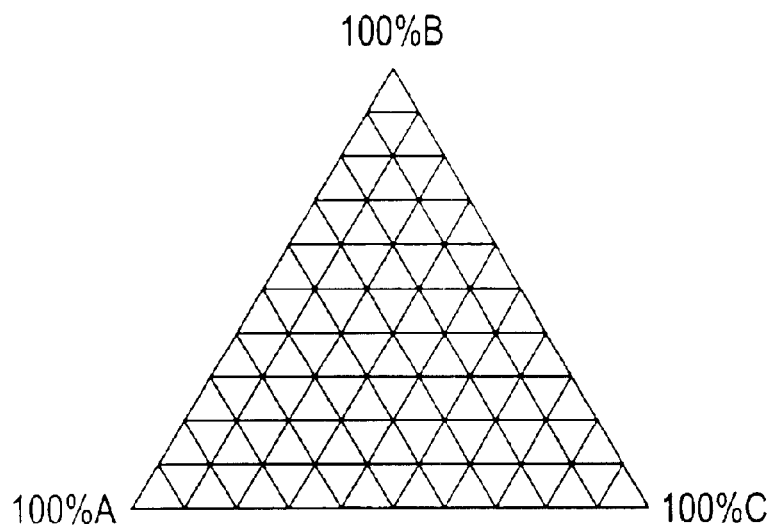
FIG. 2 is a triangular coordinate representation of a ternary mixture study.
Figure 3:
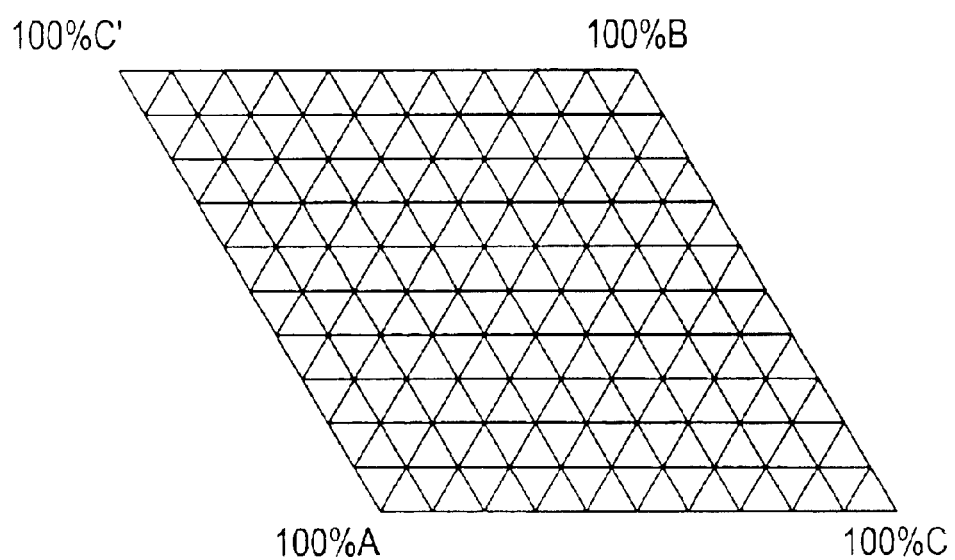
FIG. 3 is a triangular coordinate representation of another ternary mixture study.
Figure 4:
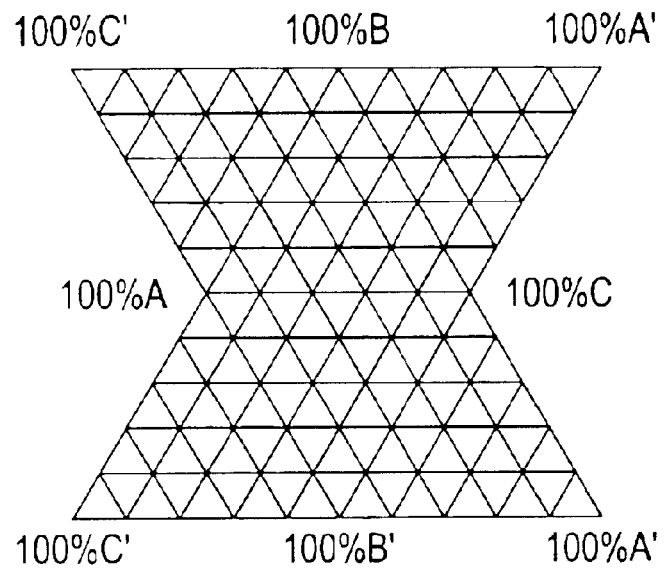
FIG. 4 is a triangular coordinate representation of another ternary mixture study.
Figure 5:
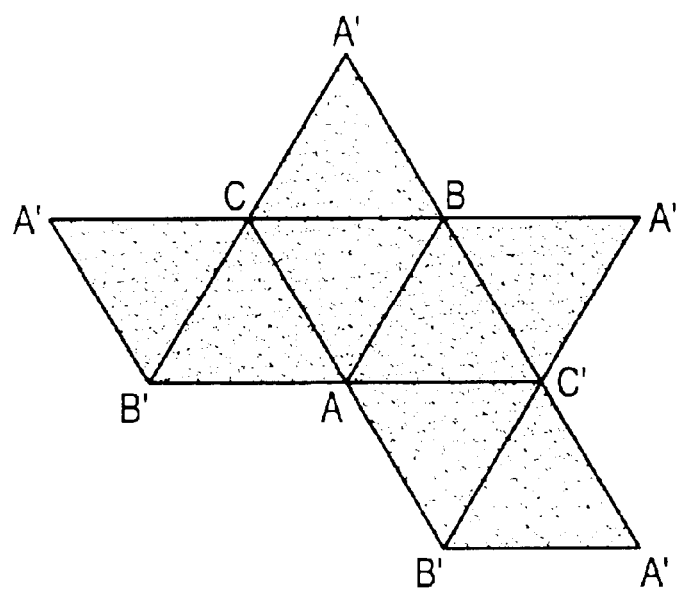
FIG. 5 is a triangular coordinate representation of another ternary mixture study.

For example. FIG. 2 represents a ternary (ABC) mixture studied separately in 10% steps. Each intersection of lines in the gradient represents one mixture to be tested. FIG. 3 illustrates a simultaneous study of the FIG. 2 mixture and a second ternary mixture (ABC') in 10% steps. In this case, A, B, and C represent components that have different roles in the mixture. C and C' have the same role in the mixture but are chemically distinct from each other. As shown in FIG. 3, the experimental spaces of the two ternary mixtures share AB combinations. The duplicate AB combination studies can be omitted with a reduction in experimental effort of (11)/(66+66)=8%. As shown in FIG. 4, an ABCA'B'C' system can be studied at 20% steps in 96 sample mixtures rather than 126 mixtures. This represents a 24% reduction in the experimental space size. Even more effective reduction occurs when eight spaces are combined as shown in FIG. 5. FIG. 5 shows a space represented by an unfolded octahedron where each factor is varied from 0 to 100%. If the systems are studied in 25% steps then the effective reduction of simultaneous study requires only 66 mixtures eliminating 54 duplicate experiments. If studied in 20% increments, 102 mixtures are required eliminating 66 redundant experiments.

A quaternary gradient representing a full range study of four factors (ABCD) forms a tetrahedron. Sixteen such tetrahedra can be combined into a four-dimensional figure that demonstrates all possible combinations of an ABCDA'B'C'D' system. Each tetrahedron will share all four of its faces and all six of its edges. The reduction in experimental space size as compared to individual experiments on each of the quaternary systems is substantial.

Many systems involve more than three or four factors and many systems have unequal numbers of factors. The reduction according to the invention is applicable to such systems. For example, a polymer resin study can have mono-functional (type "A"), di-functional (type "B") and tri-functional (type "C") monomers combined in mixtures. The system may include four examples of mono-functional ($A^1$, $A^2$, $A^3$, $A^4$), five examples of di-functional ($B^1$, $B^2$, $B^3$, $B^4$, $B^5$) and two examples of tri-functional ($C^1$ and $C^2$) monomers. The minimum number of runs needed for overlapping ternary systems $A^1B^1C^1A^2B^2C^2 \ldots A^{(nA)}B^{(nB)}C^{(nC)}$ or quaternary systems, $A^1B^1C^1D^1A^2B^2C^2D^2 \cdots A^{(nA)}B^{(nB)}C^{(nC)}D^{(nD)}$, where $n_A$, $n_B$, etc. are equal to the number of monomers of types A, B, etc. can be studied simultaneously in a minimum number of experiments, which can be can be determined from TABLE 1 and the following algorithm.

TABLE 1

| | |
|---|---|
| T | = total number of types of factors or reagents. T = 3 for a ternary system, T = 4 for a quaternary system, etc. |
| $n_T$ | = number of factors or reagents of type "T" |
| $Q_T = n_1 \times n_2 \times n_3 \times n_4 \times \ldots \times n_T$ | = number of separate T-dimensional gradients needed if overlapping not used |
| $V = n_1 + n_2 + n_3 + n_4 + \ldots + n_T$ | = number of vertices needed when overlapping used. |

TABLE 1-continued

| | |
|---|---|
| M | = the number of intervals from 0 to 100%, inclusive, for each factor (M = 6 for intervals = 20%) |
| $E_T = \dfrac{M \times (M+1) \times (M+2) \times (M+T-2)}{1 \times 2 \times 3 \times M(T-1)}$ | = total number of experiments needed for a single space with T types and M intervals |
| $I_T = \dfrac{(M-2)+(M-3)\times \ldots +(M-T)}{1 \times 2 \times 3 \times M(T-1)}$ | = total number of experiments needed for the "T-way" combinations of factors of a single space with T types and M intervals |

$Q_T \times E_T$ = number of experiments needed if all gradients are run without overlap Ternary:

$$V + \prod_{i=1}^{3} n_i \times I_3 + \left[ \sum_{i=1}^{3} \frac{1}{n_i} \prod_{i=1}^{3} n_i \right] \times I_2$$

The total number of experiments (the experimental space) needed in a quaternary and pentanary systems with overlapping are as follows:

Quaternary:

$$V + \prod_{i=1}^{4} n_i \times I_4 + \left[ \sum_{i=1}^{4} \frac{1}{n_i} \prod_{i=1}^{4} n_i \right] \times I_3 + \left[ \sum_{i=1}^{4} \sum_{j=i+1}^{4} \frac{1}{n_i n_j} \prod_{i=1}^{4} n_i \right] \times I_2$$

Pentanary:

$$V + \prod_{i=1}^{5} n_i \times I_5 + \left[ \sum_{i=1}^{5} \frac{1}{n_i} \prod_{i=1}^{5} n_i \right] \cdot I_4 +$$

$$\left[ \sum_{i=1}^{5} \sum_{j=i+1}^{5} \frac{1}{n_i n_j} \prod_{i=1}^{5} n_i \right] \times I_3 + \left[ \sum_{i=1}^{5} \sum_{j=i+1}^{5} \sum_{k=j+1}^{5} \frac{1}{n_i n_j n_k} \prod_{i=1}^{5} n_i \right] \times I_2$$

The algorithm described in TABLE 2 represents a minimum experimental space for any mixture system of 2 or more types of factors.

TABLE 2

| | |
|---|---|
| First Term | V |
| Secon Term | $\prod_{i=1}^{T} n_i \times I_T$ |
| The Third and subsequent terms consist of the product of three expressions (as shown in brackets here) | $\left( \sum_{i=1}^{T} \frac{1}{n_i} \right) \times \left( \prod_{i=1}^{T} n_i \right) \times [I_{(T-1)}]$ |

Each subsequent term is created from the previous term by:

1. Decrementing the subscript on I (e.g. $I_{(T-1)} \rightarrow I_{(T-2)}$) in the third expression
2. Not changing the second expression
3. In the first expression, Adding an additional summation, incremented over another index (e.g. i→j) from a starting point one unit higher than the first summation, e.g.

$$\sum_{i=}^{T} \rightarrow \sum_{i=j}^{T} \sum_{j=i+1}^{T}$$

Adding a value of n, indexed by the next index, to the inverse term. e.g.

$$\frac{1}{n_i} \rightarrow \frac{1}{n_i n_j}$$

While the invention advantageously defines a minimum experimental space for any mixture experiment, the invention is of particular advantage in defining experimental space for a high throughput screening (HTS) of mixtures. Particularly, the invention is directed to a method and system for defining an experimental space and conducting a combinatorial high throughput screening (CHTS) of the experimental space to determine a best case set of reaction factors.

In experimental reaction systems, each potential combination of reactant, catalyst and condition must be evaluated in a manner that provides correlation to performance in a production scale reactor. Combinatorial organic synthesis (COS) is a high throughput screening (HTS) methodology that was developed for pharmaceuticals. COS uses systematic and repetitive synthesis to produce diverse molecular entities formed from sets of chemical "building blocks." As with traditional research. COS relies on experimental synthesis methodology. However, instead of synthesizing a single compound, COS exploits automation and miniaturization to produce large libraries of compounds through successive stages, each of which produces a chemical modification of an existing molecule of a preceding stage. A library is a physical, trackable collection of samples resulting from a definable set of processes or reaction steps. The libraries comprise compounds that can be screened for various activities.

Typically, a CHTS method is characterized by parallel reactions at a micro scale. In one aspect. CHTS can be described as a method comprising (A) an iteration of steps of (i) selecting a set of reactants, (ii) reacting the set and (iii) evaluating a set of products of the reacting step and (B) repeating the iteration of steps (i), (ii) and (iii) wherein a successive set of reactants selected for a step (i) is chosen as a result of an evaluating step (iii) of a preceding iteration.

In another typical CHTS method, a multiplicity of tagged reactants is subjected to an iteration of steps of (A) (i) simultaneously reacting the reactants, (ii) identifying a multiplicity of tagged products of the reaction and (B) evaluating the identified products after completion of a single or repeated iteration (A).

A typical CHTS can utilize advanced automated, robotic, computerized and controlled loading, reacting and evaluating procedures.

In one embodiment, the method of the invention can comprise (A) defining a first experimental space comprising factors of at least two mixtures with at least one common factor, (B) defining a second experimental space by deleting duplicate factor combinations from the first experimental space, (C) (a) reacting a reactant selected from the second experimental space under a set of catalysts or reaction conditions selected from the second experimental space and (b) evaluating a set of products of the reacting step and (D) reiterating step (C) wherein a next second experimental space selected for a step (a) is chosen as a result of an evaluating step (b) of a preceding iteration of step (C).

In this embodiment, the invention can be applied to study a process for preparing diaryl carbonates. Diaryl carbonates such as diphenyl carbonate can be prepared by reaction of hydroxyaromatic compounds such as phenol with oxygen and carbon monoxide in the presence of a catalyst composition comprising a Group VIIIB metal such as palladium or a compound thereof, a bromide source such as a quaternary ammonium or hexaalkylguanidinium bromide and a polyaniline in partially oxidized and partially reduced form. The invention can be applied to screen for a catalyst to prepare a diaryl carbonate by carbonylation.

Various methods for the preparation of diaryl carbonates by a carbonylation reaction of hydroxyaromatic compounds with carbon monoxide and oxygen have been disclosed. The carbonylation reaction requires a rather complex catalyst. Reference is made, for example, to Chaudhari et al., U.S. Pat. No. 5,917,077. The catalyst compositions described therein comprise a Group VIIIB metal (i.e., a metal selected from the group consisting of ruthenium, rhodium, palladium, osmium, iridium and platinum) or a complex thereof.

The catalyst material also includes a bromide source. This may be a quaternary ammonium or quaternary phosphonium bromide or a hexaalkylguanidinium bromide. The guanidinium salts are often preferred; they include the $\alpha$, $\omega$-bis (pentaalkylguanidinium)alkane salts. Salts in which the alkyl groups contain 2–6 carbon atoms and especially tetra-n-butylammonium bromide and hexaethylguanidinium bromide are particularly preferred.

Other catalytic constituents are necessary in accordance with Chaudhari et al. The constituents include inorganic cocatalysts, typically complexes of cobalt(II) salts with organic compounds capable of forming complexes, especially pentadentate complexes. Illustrative organic compounds of this type are nitrogen-heterocyclic compounds including pyridines, bipyridines, terpyridines, quinolines, isoquinolines and biquinolines; aliphatic polyamines such as ethylenediamine and tetraalkylethylenediamines; crown ethers; aromatic or aliphatic amine ethers such as cryptanes; and Schiff bases. The especially preferred inorganic cocatalyst in many instances is a cobalt(II) complex with bis-3-(salicylalamino)propylmethylamine.

Organic cocatalysts may be present. These cocatalysis include various terpyridine, phenanthroline, quinoline and isoquinoline compounds including 2,2':6',2"-terpyridine, 4-methylthio-2,2':6',2"-terpyridine and 2,2':6',2"-terpyridine N-oxide,1.10-phenanthroline, 2,4,7,8-tetramethyl-1,10-phenanthroline, 4,7-diphenyl-1,10, phenanthroline and 3,4,7,8-tetramethyl-1,10-phenanthroline. The terpyridines and especially 2,2':6',2"-terpyridine are preferred.

Another catalyst constituent is a polyaniline in partially oxidized and partially reduced form.

Any hydroxyaromatic compound may be employed. Monohydroxyaromatic compounds, such as phenol, the cresols, the xylenols and p-cumylphenol are preferred with phenol being most preferred. The method may be employed with dihydroxyaromatic compounds such as resorcinol, hydroquinone and 2,2-bis(4-hydroxyphenyl)propane or "bisphenol A," whereupon the products are polycarbonates.

Other reagents in the carbonylation process are oxygen and carbon monoxide, which react with the phenol to form the desired diaryl carbonate.

These and other features will become apparent from the drawings and following detailed discussion, which by way of example without limitation describe preferred embodiments of the present invention.

EXAMPLE

This example illustrates an identification of an active and selective catalyst for the production of aromatic carbonates.

The method identifies a best cocatalyst from a complex chemical space, where the chemical space is defined as an assemblage of all possible ratios of combinations of certain Group IVb, Group VIb, and Lanthanide Group metal complexes. The chemical space consists of the following chemical factors of TABLE 3:

TABLE 3

| Group IVb complex | Group VIb complex | Lanthanide complex |
|---|---|---|
| Ti(acac)2 | Cr(acac)3 | Ce(acac)3 |
| Zr(acac)2 | Mo(acac)3 | Eu(acac)3 |

The combinations that are sampled are shown in TABLE 4.

TABLE 4

| ABC | ABC' | AB'C | A'BC | AB'C' | A'BC' | A'B'C | A'B'C' |
|---|---|---|---|---|---|---|---|
| Ti(acac) | Ti(acac) | Ti(acac) | Zr(acac) | Ti(acac) | Zr(acac) | Zr(acac) | Zr(acac) |
| 2Cr(acac) | 2Cr(acac) | 2Mo(acac) | 2Cr(acac) | 2Mo(acac) | 2Cr(acac) | 2Mo(acac) | 2Mo(acac) |
| 3Ce(acac)3 | 3Eu(acac)3 | 3Ce(acac)3 | 3Ce(acac)3 | 3Eu(acac)3 | 3Eu(acac)3 | 3Ce(acac)3 | 3Eu(acac)3 |

Figure 6:
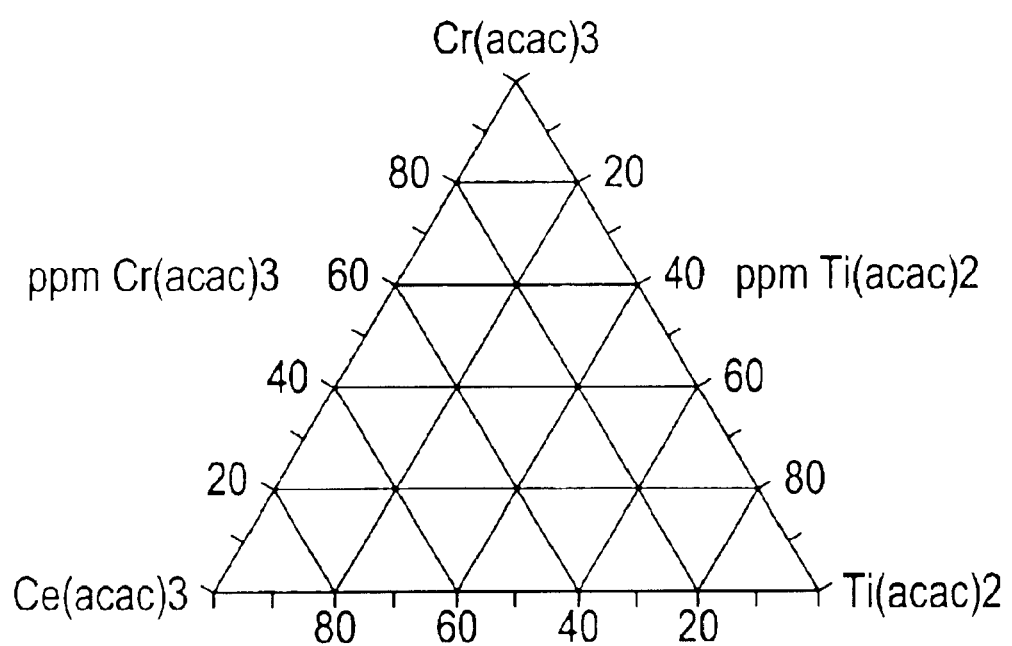
FIG. 6 is a triangular coordinate representation of still another ternary mixture study.

To sample the possible ratios of the factors as finely as possible, they are arranged in a well-known ternary gradient with 20% steps of each factor as shown in FIG. 6. FIG. 6 shows an ABC system. Each intersection of the lines in the gradient represents one mixture to be tested. There are thus 21 mixtures to be tested in the ABC system, and 8×21=168 mixtures in the entire system before application of the procedures described in the invention. By application of the invention, only the 102 unique mixtures of the 168 mixtures are required to be tested. This represents a 39.3% reduction in experimental space. The 102 runs are given in TABLE 5, where values are in ppm.

TABLE 5

| Mixture | Ti (acac)2 | Cr (acac)3 | Ce (acac)3 | Zr (acac)2 | Mo (acac)3 | Eu (acac)3 | TON |
|---|---|---|---|---|---|---|---|
| 1 | 0 | 0 | 0 | 100 | 0 | 0 | 1149 |
| 2 | 0 | 0 | 20 | 80 | 0 | 0 | 954 |
| 3 | 0 | 0 | 40 | 60 | 0 | 0 | 467 |
| 4 | 0 | 0 | 60 | 40 | 0 | 0 | 779 |
| 5 | 0 | 0 | 80 | 20 | 0 | 0 | 635 |
| 6 | 0 | 0 | 100 | 0 | 0 | 0 | 824 |
| 7 | 0 | 20 | 0 | 80 | 0 | 0 | 445 |
| 8 | 0 | 20 | 20 | 60 | 0 | 0 | 386 |
| 9 | 0 | 20 | 40 | 40 | 0 | 0 | 1091 |
| 10 | 0 | 20 | 60 | 20 | 0 | 0 | 727 |
| 11 | 0 | 20 | 80 | 0 | 0 | 0 | 515 |
| 12 | 0 | 40 | 0 | 60 | 0 | 0 | 850 |
| 13 | 0 | 40 | 20 | 40 | 0 | 0 | 323 |
| 14 | 0 | 40 | 40 | 20 | 0 | 0 | 393 |
| 15 | 0 | 40 | 60 | 0 | 0 | 0 | 903 |
| 16 | 0 | 60 | 0 | 40 | 0 | 0 | 1018 |
| 17 | 0 | 60 | 20 | 20 | 0 | 0 | 983 |
| 18 | 0 | 60 | 40 | 0 | 0 | 0 | 1053 |
| 19 | 0 | 80 | 0 | 20 | 0 | 0 | 505 |
| 20 | 0 | 80 | 20 | 0 | 0 | 0 | 463 |
| 21 | 0 | 100 | 0 | 0 | 0 | 0 | 708 |
| 22 | 0 | 0 | 0 | 80 | 0 | 20 | 501 |
| 23 | 0 | 20 | 0 | 60 | 0 | 20 | 1113 |
| 24 | 0 | 40 | 0 | 40 | 0 | 20 | 959 |
| 25 | 0 | 60 | 0 | 20 | 0 | 20 | 481 |
| 26 | 0 | 80 | 0 | 0 | 0 | 20 | 953 |
| 27 | 0 | 0 | 0 | 60 | 0 | 40 | 744 |
| 28 | 0 | 20 | 0 | 40 | 0 | 40 | 723 |
| 29 | 0 | 40 | 0 | 20 | 0 | 40 | 1106 |
| 30 | 0 | 60 | 0 | 0 | 0 | 40 | 360 |
| 31 | 0 | 0 | 0 | 40 | 0 | 60 | 490 |
| 32 | 0 | 20 | 0 | 20 | 0 | 60 | 751 |
| 33 | 0 | 40 | 0 | 0 | 0 | 60 | 718 |
| 34 | 0 | 0 | 0 | 20 | 0 | 80 | 472 |
| 35 | 0 | 20 | 0 | 0 | 0 | 80 | 760 |
| 36 | 0 | 0 | 0 | 0 | 0 | 100 | 1300 |
| 37 | 0 | 0 | 0 | 80 | 20 | 0 | 893 |
| 38 | 0 | 0 | 20 | 60 | 20 | 0 | 480 |
| 39 | 0 | 0 | 40 | 40 | 20 | 0 | 350 |
| 40 | 0 | 0 | 60 | 20 | 20 | 0 | 330 |
| 41 | 0 | 0 | 80 | 0 | 20 | 0 | 1202 |
| 42 | 0 | 0 | 0 | 60 | 20 | 20 | 615 |
| 43 | 0 | 0 | 0 | 40 | 20 | 40 | 1056 |
| 44 | 0 | 0 | 0 | 20 | 20 | 60 | 1060 |
| 45 | 0 | 0 | 0 | 0 | 20 | 80 | 1149 |
| 46 | 0 | 0 | 0 | 60 | 40 | 0 | 452 |
| 47 | 0 | 0 | 20 | 40 | 40 | 0 | 536 |
| 48 | 0 | 0 | 40 | 20 | 40 | 0 | 640 |
| 49 | 0 | 0 | 60 | 0 | 40 | 0 | 852 |
| 50 | 0 | 0 | 0 | 40 | 40 | 20 | 713 |
| 51 | 0 | 0 | 0 | 20 | 40 | 40 | 1186 |
| 52 | 0 | 0 | 0 | 0 | 40 | 60 | 913 |
| 53 | 0 | 0 | 0 | 40 | 60 | 0 | 816 |
| 54 | 0 | 0 | 20 | 20 | 60 | 0 | 508 |
| 55 | 0 | 0 | 40 | 0 | 60 | 0 | 760 |
| 56 | 0 | 0 | 0 | 20 | 60 | 20 | 658 |
| 57 | 0 | 0 | 0 | 0 | 60 | 40 | 1341 |
| 55 | 0 | 0 | 0 | 20 | 80 | 0 | 882 |
| 59 | 0 | 0 | 20 | 0 | 80 | 0 | 381 |
| 60 | 0 | 0 | 0 | 0 | 80 | 20 | 728 |
| 61 | 0 | 0 | 0 | 0 | 100 | 0 | 412 |
| 62 | 20 | 0 | 0 | 80 | 0 | 0 | 393 |
| 63 | 20 | 20 | 0 | 60 | 0 | 0 | 909 |
| 64 | 20 | 40 | 0 | 40 | 0 | 0 | 1092 |
| 65 | 20 | 60 | 0 | 20 | 0 | 0 | 516 |
| 66 | 20 | 80 | 0 | 0 | 0 | 0 | 777 |
| 67 | 20 | 60 | 0 | 0 | 0 | 20 | 548 |
| 68 | 20 | 40 | 0 | 0 | 0 | 40 | 465 |
| 69 | 20 | 20 | 0 | 0 | 0 | 60 | 1212 |
| 70 | 20 | 0 | 0 | 0 | 0 | 80 | 907 |
| 71 | 20 | 0 | 0 | 60 | 20 | 0 | 580 |
| 72 | 20 | 0 | 0 | 0 | 20 | 60 | 3557 |
| 73 | 20 | 0 | 0 | 40 | 40 | 0 | 1003 |
| 74 | 20 | 0 | 0 | 0 | 40 | 40 | 4238 |
| 75 | 20 | 0 | 0 | 20 | 60 | 0 | 858 |
| 76 | 20 | 0 | 0 | 0 | 60 | 20 | 3337 |
| 77 | 20 | 0 | 0 | 0 | 80 | 0 | 1426 |
| 78 | 40 | 0 | 60 | 0 | 0 | 0 | 520 |
| 79 | 40 | 20 | 40 | 0 | 0 | 0 | 623 |
| 80 | 40 | 40 | 20 | 0 | 0 | 0 | 414 |
| 81 | 40 | 60 | 0 | 0 | 0 | 0 | 477 |
| 82 | 40 | 40 | 0 | 0 | 0 | 20 | 622 |
| 83 | 40 | 20 | 0 | 0 | 0 | 40 | 1130 |
| 84 | 40 | 0 | 0 | 0 | 0 | 60 | 1405 |
| 85 | 40 | 0 | 0 | 40 | 20 | 0 | 1327 |
| 86 | 40 | 0 | 0 | 0 | 20 | 40 | 4605 |
| 87 | 40 | 0 | 20 | 0 | 40 | 0 | 886 |

TABLE 5-continued

| Mixture | Ti (acac)2 | Cr (acac)3 | Ce (acac)3 | Zr (acac)2 | Mo (acac)3 | Eu (acac)3 | TON |
|---|---|---|---|---|---|---|---|
| 88 | 40 | 0 | 0 | 0 | 40 | 20 | 4531 |
| 89 | 40 | 0 | 0 | 0 | 60 | 0 | 1308 |
| 90 | 60 | 0 | 40 | 0 | 0 | 0 | 1159 |
| 91 | 60 | 20 | 20 | 0 | 0 | 0 | 750 |
| 92 | 60 | 40 | 0 | 0 | 0 | 0 | 711 |
| 93 | 60 | 20 | 0 | 0 | 0 | 20 | 1052 |
| 94 | 60 | 0 | 0 | 0 | 0 | 40 | 1133 |
| 95 | 60 | 0 | 20 | 0 | 20 | 0 | 1202 |
| 96 | 60 | 0 | 0 | 0 | 20 | 20 | 3908 |
| 97 | 60 | 0 | 0 | 0 | 40 | 0 | 1238 |
| 98 | 80 | 0 | 20 | 0 | 0 | 0 | 750 |
| 99 | 80 | 20 | 0 | 0 | 0 | 0 | 675 |
| 100 | 80 | 0 | 0 | 0 | 0 | 20 | 848 |
| 101 | 80 | 0 | 0 | 0 | 20 | 0 | 1439 |
| 102 | 100 | 0 | 0 | 0 | 0 | 0 | 432 |

Catalyst mixtures are made up in phenol solvent containing the following factors of TABLE 6 and the cocatalyst mixture using the concentrations of each factor as given in the rows of TABLE 6. The total volume of each catalyst mixture is 1.0 ml. From each mixture, a 25 microliter aliquot is dispensed into a 2 ml reaction vial, forming a film on the bottom. The vials are subjected to 1000 psi pressure at 100° C. for 120 min. At the end of the reaction time, the system is cooled and depressurized and the contents of each vial are analyzed for diphenyl carbonate product using conventional gas chromatographic methods. The turnover number (TON) for each reaction is calculated as (mols of diphenylcarbonate/mols of primary catalyst). The results are given in the column TON of TABLE 5.

TABLE 6

| Primary Catalyst: | Pd(acac)2 | 25 ppm |
|---|---|---|
| Anion Cocatalyst | (Et3N)Br | 800 ppm |

Figure 7:
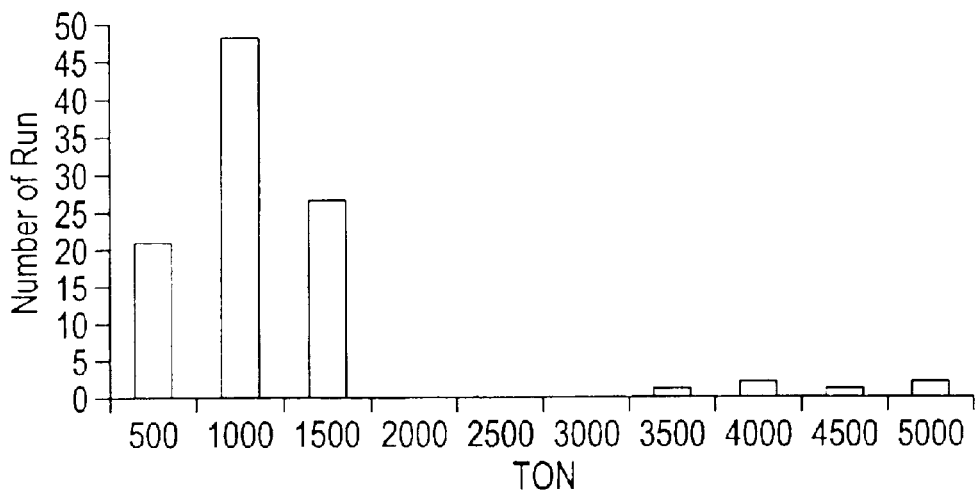
FIG. 7 is a histogram of TON results.
Figure 8:
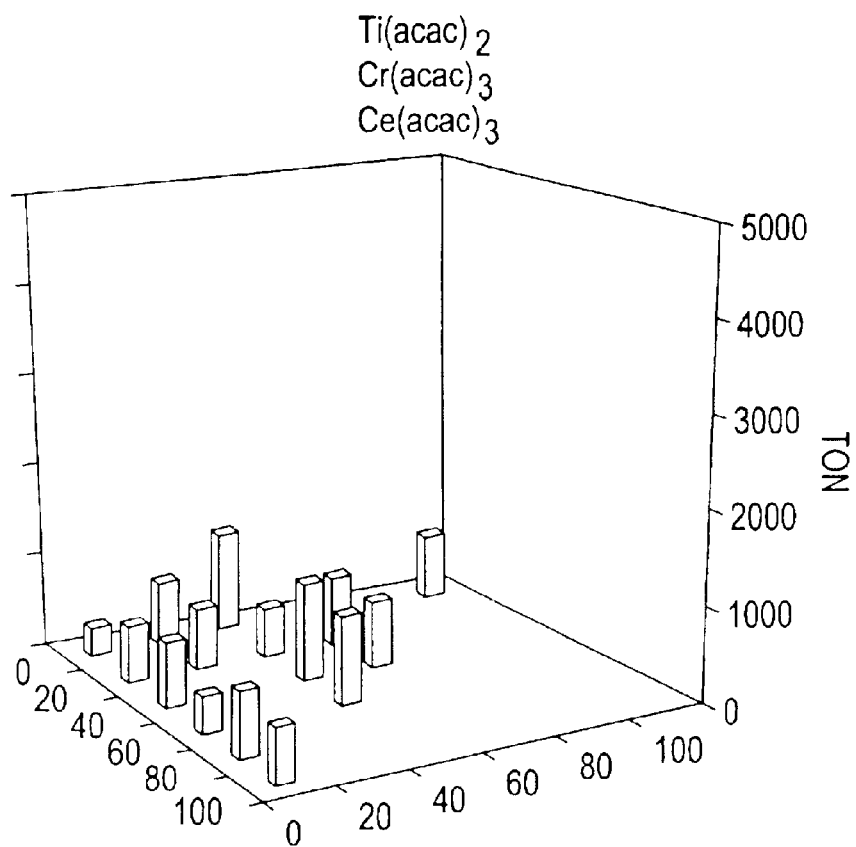
FIGS. 8, 9 and 10 are bar charts of TON results.
Figure 9:
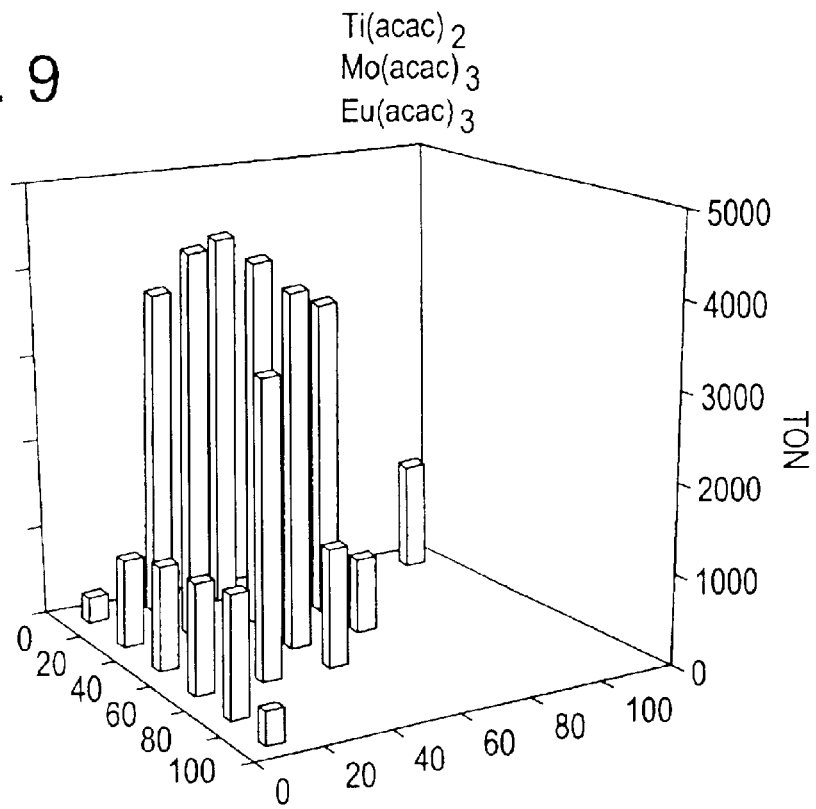
Figure 10:
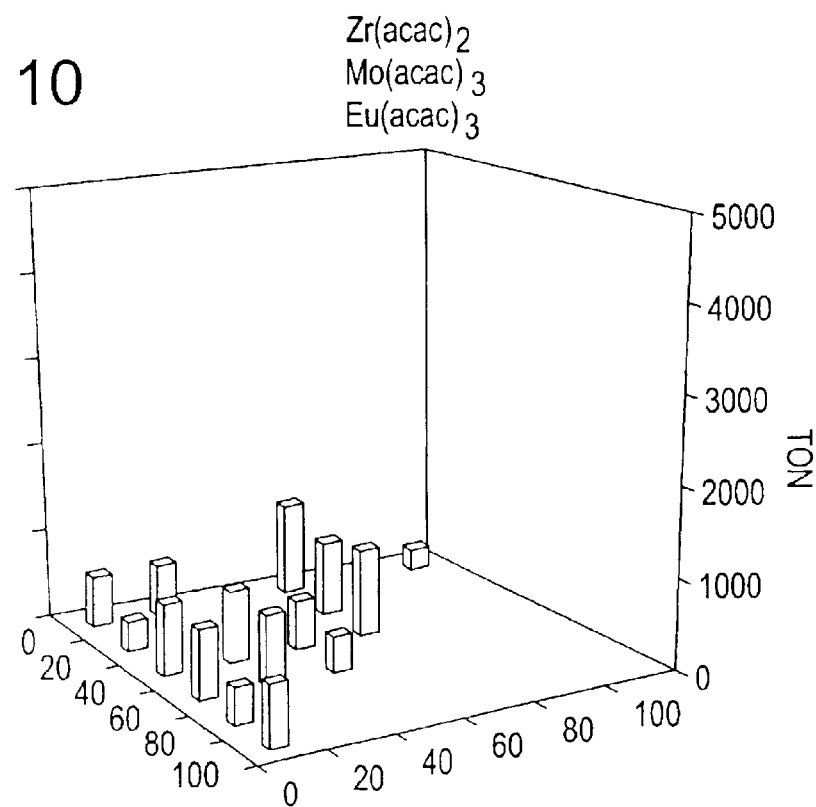

A histogram, FIG. 7, depicting the number of the 102 experiments which fall into certain ranges of Turnover Number (TON), shows that there are five unusually high values (>1500 TON), which are associated with runs 72, 74, 76, 86, 88, and 96. Examination of these runs shows that they all contain the ternary combination: Ti(acac)2, Mo(acac)3, and Eu(acac)3. The effect of the three way combination of $Ti(acac)_2$, $Mo(acac)_3$, and $Eu(acac)_3$ is further demonstrated in FIGS. 8–10. Each of these 3-D bar charts corresponds to one of the 8 ternaries listed in TABLE 4. The vertical (Z) axis depicts the TON response and the X and Y axes the relative amounts of two of the three reactant mixtures in the ternary. Since the total amount of all three reactants equals a constant value (100 ppm in this case), the third reactant proportion for a given TON is equal to 100 minus the sum of the values of the other two reactants for that TON. These charts show that the full complement of ternaries can be constructed using the reduced space of the invention and that areas of high activity can be delineated using the technique.

While preferred embodiments of the invention have been described, the present invention is capable of variation and modification and therefore should not be limited to the precise details of the Examples. For example, the invention is applicable to a wide variety of experimental systems where multiple mixtures of components with common elements must be studied in gradients. Examples of such systems include organic systems such as polymers, coatings and adhesives and inorganic systems such as phosphors and scintillators and even metal systems such as alloys.

The invention includes changes and alterations that fall within the purview of the following claims.

What is claimed is:

1. A method, comprising:
   (A) defining a first experimental space comprising factors of at least two mixtures with at least one common factor;
   (B) determining a number of experiments for a second experimental space by the relationship $$V + \prod_{i=1}^{3} n_i \times I_3 + \left[ \sum_{i=1}^{3} \frac{1}{n_i} \prod_{i=1}^{3} n_i \right] \times I_2;$$

for a ternary system (T=3) or an algorithm for a succeeding T-nary system, determined from a previous term by: (a) adding an additional term which contains an additional summation, incremented over a next index from a starting point one unit higher than the first summation; (b) decrementing the subscript on I; and (c) adding a value of n, indexed by the next index, to the inverse term;
   (C) deleting duplicate factor combinations from the first determined experimental space to define a second experimental space wvith a number of experiments determined in (B); and
   (D) conducting a combinatorial high throughput screening (CHTS) experiment on said second experimental space, comprising an iteration of steps of simultaneously reacting a multiplicity of tagged reactants and identifying a multiplicity of tagged products of the reaction and evaluating said identified products after completion of a single or repeated iteration to select a best case set of factors from said second experimental space.

2. The method of claim 1, wherein said second experimental space factors comprise reactants, catalysts and conditions and said (D) comprises (a) reacting a reactant selected from the second experimental space under a set of catalysts or reaction conditions selected from the second experimental space and (b) evaluating a set of products of the reacting step and further comprising (E) reiterating step (D) wherein a next second experimental space selected for a step (a) is chosen as a result of an evaluating step (b) of a preceding iteration of step (D).

3. The method of claim 2, comprising reiterating (D) until a best set of factors of said second experimental space is selected.

4. The method of claim 1, wherein said first experimental space includes a catalyst system comprising combinations of Group IVB, Group VIB and Lanthanide Group metal complexes.

5. The method of claim 1, wherein said second experimental space includes a catalyst system comprising a Group VIIIB metal.

6. The method of claim 1, wherein said second experimental space includes a catalyst system comprising palladium.

7. The method of claim 1, wherein said second space includes a catalyst system comprising a halide composition.

8. The method of claim 1, wherein said second experimental space includes an inorganic co-catalyst.

9. The method of claim 1, wherein said second experimental space includes a catalyst system that includes a combination of inorganic co-catalysts.

10. A system for selecting a best case set of experiments of a experimental reaction, comprising;
   a processor that (A) defines a first experimental space comprising factors of at least two mixtures with at least one common factor; (B) determines a number of experiments for a second experimental space by the relationship $$V + \prod_{i=1}^{3} n_i \times I_3 + \left[ \sum_{i=1}^{3} \frac{1}{n_i} \prod_{i=1}^{3} n_i \right] \times I_2$$

for a ternary system (T=3) or an algorithm for a succeeding T-nary system, determined from a previous term by: (a) adding an additional term which contains an additional summation, incremented over a next index from a starting point one unit higher than the first summation; (b) decrementing the subscript on I; and (c) adding a value of n, indexed by the next index, to the inverse term; and (C) deletes duplicate factor combinations from the first determined experimental space to define a second experimental space with a number of experiments determined in (B); and
   a reactor and evaluator to select a best case set of factors from said second experimental space by a combinatorial high throughput screening (CHTS) method to select a best case set of factors from said experimental space.

11. The system of claim 10, wherein said processor comprises
   a display terminal having screen displays whereby a researcher can input values for factors on said screen;
   a database for storing said factors;
   a computer for generating a set of test cases for a set of said factors based on a researcher specified value for identifying a number of interacting relationships within said factors;
   a computer combining said test cases for set of factors with said relationships and providing a merged table of test cases; and
   an output for writing to a database said merged table of test cases.

12. The system of claim 10, wherein said second experimental space is a quaternary space comprising a number of experiments defined by $$V + \prod_{i=1}^{4} n_i \times I_4 + \left[ \sum_{i=1}^{4} \frac{1}{n_i} \prod_{i=1}^{4} n_i \right] \times I_3 + \left[ \sum_{i=1}^{4} \sum_{j=i+1}^{4} \frac{1}{n_i n_j} \prod_{i=1}^{4} n_i \right] \times I_2.$$

13. The system of claim 10, wherein said second experimental space is a pentanary space comprising a number of experiments defined by $$V + \prod_{i=1}^{5} n_i \times I_5 + \left[ \sum_{i=1}^{5} \frac{1}{n_i} \prod_{i=1}^{5} n_i \right] \times I_4 +$$

$$\left[ \sum_{i=1}^{5} \sum_{j=i+1}^{5} \frac{1}{n_i n_j} \prod_{i=1}^{5} n_i \right] \times I_3 + \left[ \sum_{i=1}^{5} \sum_{j=i+1}^{5} \sum_{k=j+1}^{5} \frac{1}{n_i n_j n_k} \prod_{i=1}^{5} n_i \right] \times I_2.$$

14. An experimental space, comprising a number of mixture combinations defined by an algorithm, which expresses the sum of terms:

$$V + \prod_{i=1}^{T} n_i \times I_1 + \left( \sum_{i=1}^{T} \frac{1}{n_i} \right) \times \left( \prod_{i=1}^{T} n_i \right) \times [I_{(T-1)}]$$

for a ternary system (T=3) or an algorithm for a succeeding T-nary system, determined from a previous term by: (a) adding an additional term which contains an additional summation, incremented over a next index from a starting point one unit higher than the first summation; (b) decrementing the subscript on I; and (c) adding a value of n, indexed by the next index, to the inverse term.

15. The experimental space of claim 14, comprising a number of mixture combinations defined by an algorithm, which expresses the sum of terms:

$$V + \prod_{i=1}^{4} n_i \times I_4 + \left[ \sum_{i=1}^{4} \frac{1}{n_i} \prod_{i=1}^{4} n_i \right] \times I_3 + \left[ \sum_{i=1}^{4} \sum_{j=i+1}^{4} \frac{1}{n_i n_j} \prod_{i=1}^{4} n_i \right] \times I_2$$

for a quaternary system.

16. The experimental space of claim 14, comprising a number of mixture combinations defined by an algorithm, which expresses the sum of terms:

$$V + \prod_{i=1}^{5} n_i \times I_5 + \left[ \sum_{i=1}^{5} \frac{1}{n_i} \prod_{i=1}^{5} n_i \right] \cdot I_4 +$$

$$\left[ \sum_{i=1}^{5} \sum_{j=i+1}^{5} \frac{1}{n_i n_j} \prod_{i=1}^{5} n_i \right] \times I_3 + \left[ \sum_{i=1}^{5} \sum_{j=i+1}^{5} \sum_{k=j+1}^{5} \frac{1}{n_i n_j n_k} \prod_{i=1}^{5} n_i \right] \times I_2$$

for a pentanary system.

* * * * *